(12) United States Patent
Osaki et al.

(10) Patent No.: US 8,321,608 B2
(45) Date of Patent: Nov. 27, 2012

(54) POOL I/O DEVICE OPERATION CONFIRMATION METHOD AND COMPUTER SYSTEM

(75) Inventors: Hiroyuki Osaki, Yokohama (JP); Futoshi Haga, Sagamihara (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 685 days.

(21) Appl. No.: 12/023,059

(22) Filed: Jan. 31, 2008

(65) Prior Publication Data
US 2008/0215771 A1  Sep. 4, 2008

(30) Foreign Application Priority Data
Mar. 1, 2007 (JP) ................................ 2007-051974

(51) Int. Cl.
*G06F 3/00* (2006.01)
*G06F 11/00* (2006.01)
(52) U.S. Cl. ................................ 710/46; 710/19; 714/1
(58) Field of Classification Search .................... 710/15, 710/19, 46
See application file for complete search history.

(56) References Cited

U.S. PATENT DOCUMENTS

| | | | |
|---|---|---|---|
| 5,491,816 A | 2/1996 | Matoba et al. | |
| 6,192,485 B1 | 2/2001 | Takita et al. | |
| 6,324,655 B1 | 11/2001 | Matoba et al. | |
| 7,246,210 B2 * | 7/2007 | Georgis et al. | 711/161 |
| 2004/0250021 A1 * | 12/2004 | Honda et al. | 711/114 |
| 2005/0007959 A1 | 1/2005 | Tomonaga et al. | |
| 2006/0224850 A1 * | 10/2006 | Yamamoto et al. | 711/170 |
| 2007/0050546 A1 * | 3/2007 | Fujii | 711/114 |
| 2007/0088930 A1 * | 4/2007 | Matsuda et al. | 711/170 |

FOREIGN PATENT DOCUMENTS

| | | |
|---|---|---|
| JP | 3-271835 | 12/1991 |
| JP | 6-89146 | 3/1994 |
| JP | 11-203157 | 7/1999 |
| JP | 2004-326809 | 11/2004 |
| JP | 2004-341994 | 12/2004 |
| JP | 2006-268521 | 10/2006 |
| WO | WO 92/05495 | 4/1992 |

OTHER PUBLICATIONS

Official Action issued in Japanese Patent Application No. 2007-051974 on Nov. 15, 2011.

* cited by examiner

*Primary Examiner* — Ernest Unelus
(74) *Attorney, Agent, or Firm* — Antonelli, Terry, Stout & Kraus, LLP.

(57) ABSTRACT

In a computer system to which a plurality of I/O devices are connected and a pool I/O device is included therein, a periodical operation confirmation is performed on a pool I/O device to be used when a fault occurs. A pool I/O device operation confirmation section obtains pool I/O device status information from a pool I/O device status information storage section (provided inside or outside the computer system). The status information includes a pool I/O device ID for identifying the pool I/O device, a type of the pool I/O device, a status value indicating an operation confirmation result, and an update time indicating the most recent operation confirmation time. Then, the pool I/O device operation confirmation section activates the pool I/O device and performs an operation confirmation thereon; terminates the operation of the pool I/O device after the operation confirmation; and updates the pool I/O device status information using the operation confirmation result obtained by the operation confirmation.

8 Claims, 11 Drawing Sheets

| Pool I/O device ID | Pool I/O device type | Status value | Update time |
|---|---|---|---|
| IO1 | PCI/NIC | Normal | yyyy year mm month dd date hh time mm minute ss second |
| IO2 | PCI-Express/HBA | Normal | yyyy year mm month dd date hh time mm minute ss second |
| IO3 | SCSI/HDD | Abnormal | yyyy year mm month dd date hh time mm minute ss second |
| IO4 | SATA/HDD | Unconfirmed | None |
| ... | ... | ... | ... |

FIG. 9

| Pool I/O device type | Test program ID |
|---|---|
| PCI/NIC | ○○○ |
| SCSI/HDD | △△△ |
| ... | ... |

901 — Pool I/O device type
902 — Test program ID
900

| Pool I/O device ID | I/O path switching section ID | I/O device connection port |
|---|---|---|
| IO1 | SW1 | p13 |
| IO1 | SW2 | p23 |
| IO2 | SW2 | p24 |

For I/O path switching section (I/O path switching section ID =SW1)

| Module connection port ID | I/O device connection port ID |
|---|---|
| p11 | p14 |
| p12 | p13 |

| I/O path switching section ID | I/O path switching section connection port ID | Module connection port ID |
|---|---|---|
| SW1 | p31 | p12 |
| SW2 | p32 | p21 |

| Key | Value |
|---|---|
| Update cycle time | 10000s |
| Sleep time | 1s |
| "Normal" end process | None |
| "Abnormal" end process | Notify management terminal of I/O device ID |

FIG. 15

| Key | Value |
|---|---|
| Update cycle time | 10000s |
| Sleep time | 1s |
| "Abnormal" end process | Notify management terminal of I/O device ID |

FIG. 16

POOL I/O DEVICE OPERATION CONFIRMATION METHOD AND COMPUTER SYSTEM

BACKGROUND OF THE INVENTION

1. Field of the Invention

The present invention relates to a pool I/O device operation confirmation method and a computer system, and more particularly, for example, to a fault management in a computer system capable of controlling an I/O device connection switching.

2. Background Art

Such a computer system dealing with mission-critical applications needs to provide services by continuously operating 24 hours a day, 365 days a year. Even if the system is terminated due to a fault of a device constituting the system, the computer system is required to restart the operation by replacement and reconfiguration of a faulty portion in as a short time as possible. However, a manual recovery process requiring device replacement and reconfiguration may take a long time, and further delay due to a human error may occur. For that reason, a method has been mainly employed in which a backup device or a pool device is provided for a device in which a fault is expected to occur, the pool device is introduced into the computer system in advance, and when a fault occurs in an operating device, the faulty portion is automatically replaced with the pool device.

A pool device connected to the computer system is usually not operating, and thus a conventional operation confirmation program cannot be applied. In such a situation, when the pool device is left as is for a long time without being removed from the computer system, a normal operation thereof cannot be guaranteed. When a fault occurs in a current device, the current device is replaced with a pool device, but if a fault occurs in the pool device, the computer system fails an automatic pool device switching process and thus restart takes a long time. To avoid such a problem, operation confirmation needs to be performed on the pool device without affecting the operating device for reduced system restart time. It should be noted that if operation confirmation is performed on all the devices by terminating the entire system or part of the system, this results in terminating the services to be provided, and thus this should be avoided.

For example, Patent Document 1 discloses a method in which a reliability test is performed as a method of detecting a fault in an I/O device in advance when a new hot plug I/O device is additionally connected to a computer system.

In addition, as a method of performing an operation confirmation on a pool device connected to an operating computer system, Patent Document 2 discloses a method in which a normal BIOS activation mechanism is used to periodically perform an operation confirmation on CELL (a board with a processor and main storage installed) which has been connected to the computer system but is not activated).

[Patent Document 1] JP Patent Publication (Kokai) No. 2004-326809

[Patent Document 2] JP Patent Publication (Kokai) No. 2006-268521

SUMMARY OF THE INVENTION

However, unfortunately, the methods disclosed in any of the aforementioned Patent Documents cannot solve the problem in that when a fault occurs in a pool I/O device connected to the computer system, the fault is left as is.

More specifically, according to the system disclosed in Patent Document 1, an operation confirmation is performed on a pool I/O device only when the pool I/O device is newly added, and a reliability test is not performed on a connected pool I/O device. For this reason, even if a fault occurs in a connected pool I/O device, the fault cannot be discovered and is left as is.

In addition, according to the system disclosed in Patent Document 2, a periodical operation confirmation of only a self-activatable pool SELL (processor plus memory) is disclosed, and a pool I/O device which cannot be activated by itself because a processor and memory are not installed is excluded from the process. Hereby, the method disclosed in Patent Document 2 cannot be employed as a method of performing an operation confirmation on a pool I/O device. For the same reason, even if a fault occurs in a connected pool I/O device, the fault cannot be discovered and is left as is.

In view of this situation, the present invention has been made to provide a method of periodically performing an operation confirmation on a pool I/O device to be used when a fault occurs in a computer system to which a plurality of I/O devices are connected and a pool I/O device is included therein.

To solve the above problems, the present invention controls the computer system so as to periodically executing an operation confirmation on a pool I/O device.

In other words, the pool I/O device operation confirmation method in accordance with the present invention is provided in a computer system including a general-purpose module having at least one processor; at least one current I/O device which is actually operating to transfer an input/output of the general-purpose module to and from an external device; at least one pool I/O device which is provided as a backup of the current I/O device and is waiting; and at least one I/O path switching section for switching the I/O paths connecting the general-purpose module, the current device and the I/O device. A pool I/O device operation confirmation section provided inside or outside the computer system periodically confirms the operation of the pool I/O device.

More specifically, the pool I/O device operation confirmation section obtains pool I/O device status information from a pool I/O device status information storage section (provided inside or outside the computer system), the status information including a pool I/O device ID for identifying the pool I/O device, a type of a pool I/O device, a status value indicating the operation confirmation result, and an update time indicating the most recent operation confirmation time; activates the pool I/O device and performs an operation confirmation thereon; terminates the operation of the pool I/O device after the operation confirmation; and updates the pool I/O device status information using the operation confirmation result obtained by the operation confirmation.

In addition, in operation confirmation, the pool I/O device operation confirmation section obtains I/O path switching section configuration information, which specifies a path for connecting to the pool I/O device and which includes an internal connection relation of the I/O path switching section, from an I/O path switching section configuration information storage section; controls the I/O path switching section based on the I/O path switching section configuration information; executes a connection to the pool I/O device to be subject to operation confirmation; and releases the connection state after the operation of the pool I/O device was confirmed. It should be noted that such I/O path switching section configuration information does not need to be obtained for each operation confirmation, but the pool I/O device operation confirmation section may execute connection to a pool I/O device by detecting an unused path of the I/O path switching section and release the connection state after the operation confirmation.

In addition, in operation confirmation, the pool I/O device operation confirmation section obtains test program information, which is included in the pool I/O device status information and which determines an operation confirmation program to be used according to the type of the pool I/O device, from a test program information storage section; executes a test program corresponding to the obtained test program information; and executes an operation confirmation on the pool I/O device.

Further more specifically, the pool I/O device operation confirmation section may obtain a status information management parameter, which is to be used for a management process of the pool I/O device status information and which includes an update cycle time, from a status information management parameter storage section and execute an operation confirmation on a pool I/O device in which the update cycle time has elapsed on the basis of the obtained status information management parameter. It should be noted that the status information management parameter further includes a sleep time as a parameter and if there is no pool I/O device in which the update cycle time has elapsed, the pool I/O device operation confirmation section may restart the pool I/O device operation confirmation after the sleep time has elapsed. Additionally, the pool I/O device operation confirmation section may change the status information management parameter in response to an input instruction from an external terminal connected to the computer system.

Further characteristics of the present invention will become more fully apparent hereinafter by the detailed description of the preferred embodiments and the accompanying drawings.

According to the present invention, in a computer system to which a plurality of I/O devices are connected and a pool I/O device is included therein, a periodical operation confirmation can be performed on a pool I/O device to be used when a fault occurs in a current I/O device. Accordingly, even if a fault occurs in a currently operating I/O device, a faulty portion can be automatically switched to a pool I/O device capable of operating normally.

DETAILED DESCRIPTION OF THE PREFERRED EMBODIMENTS

Hereinafter, embodiments of the present invention will be described with reference to the accompanying drawings. It should be noted that embodiments are only examples for implementing the present invention, and do not limit the present invention. In the following drawings identical in configuration, like reference numerals refer to like components throughout the drawings.

<Computer System Configuration>

Figure 1:
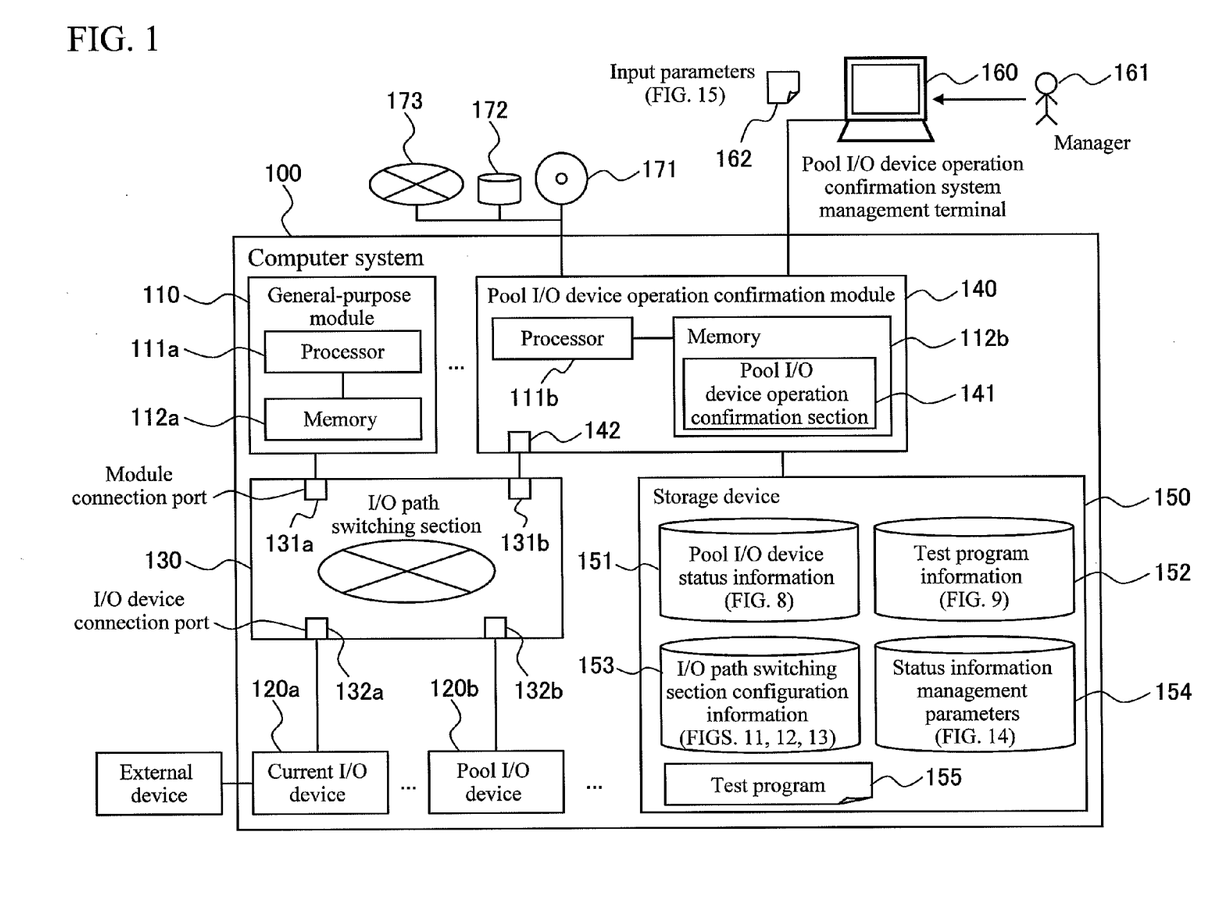
FIG. 1 shows a schematic configuration of a pool I/O device operation confirmation system including a computer system in accordance with an embodiment of the present invention.

FIG. 1 shows a schematic configuration of an entire computer system in accordance with an embodiment of the present invention. In FIG. 1, a computer system 100 (for example, a blade server) is provided with a general-purpose module 110, one or more I/O devices 120*a* and 120*b*, one or more I/O path switching sections 130, one or more pool I/O device operation confirmation modules 140, and a storage device 150.

Here, the general-purpose module 110 is configured to have one or more processors 111*a* and one or more memories 112*a* and to be connected to I/O devices 120*a* and 120*b* through the I/O path switching section 130. The I/O devices 120*a* and 120*b* are input-output (interface) devices for connecting the general-purpose module 110 to an external device such as a network device and a storage device. All the I/O devices 120*a* and 120*b* are connected to the I/O path switching section 130.

The I/O path switching section 130 is provided to connect the general-purpose module 110, the pool I/O device operation confirmation module 140, and the I/O devices 120*a* and 120*b* to each other. For example, one or more general-purpose modules 110 are connected to a module connection port 131*a* in the I/O path switching section 130. Additionally, the pool I/O device operation confirmation module 140 is connected to a module connection port 131*b* in the I/O path switching section 130. Further, one or more I/O devices 120*a* and 120*b* are connected to the I/O device connection ports 132*a* and 132*b* respectively. Accordingly, the I/O path switching section 130 is configured to connect any general-purpose module 110, the pool I/O device operation confirmation module 140 and any I/O devices 120*a* and 120*b* to each other by switching paths between the module connection ports 131*a* and 131*b*, and the I/O device connection ports 132*a* and 132*b*.

The pool I/O device operation confirmation module 140 is provided with one or more processors 111*b* and one or more memories 112*b*. The I/O path switching section 130, a storage device 150, and a pool I/O device operation confirmation system management terminal 160 are connected to the pool I/O device operation confirmation module 140. The pool I/O device operation confirmation module 140 can send a control signal to the I/O path switching section. For example, when operation confirmation is executed on a pool I/O device, the I/O path switching section 130 establishes connection between the pool I/O device operation confirmation module 140 and the pool I/O device 120b in response to an instruction (control signal) from the pool I/O device operation confirmation module 140 (detailed operation will be described later).

It should be noted that the pool I/O device operation confirmation module 140 does not need to be provided as dedicated hardware, but the same type as the general-purpose module 110 may be used.

In addition, FIG. 1 shows only one I/O path switching section 130 and one pool I/O device operation confirmation module 140, but two or more I/O path switching sections 130 and two or more pool I/O device operation confirmation modules 140 may be provided to prevent a single point of failure or to provide high bandwidth (multiplexing).

Further, in FIG. 1, a plurality of paths may be provided between the I/O path switching section 130 and the pool I/O device operation confirmation module 140 or between the I/O path switching section 130 and the I/O devices 120a and 120b (for path multiplexing).

For example, a plurality of paths may be provided between the I/O path switching section 130 and the pool I/O device operation confirmation module 140 so that the pool I/O device operation confirmation module 140 can connect to a plurality of I/O devices 120b at the same time.

Alternatively, a plurality of paths between the I/O path switching section 130 and the pool I/O device operation confirmation module 140 may be divided into two types of paths: one for sending a control signal to the I/O path switching section and one for connecting to an I/O device.

The storage device 150 contains pool I/O device status information 151 (see FIG. 8), I/O path switching section configuration information 153 (see FIGS. 11 to 13), test program information 152 (see FIG. 9), status information management parameters 154 (see FIG. 14), and a test program 155.

The pool I/O device operation confirmation system management terminal 160 is connected to the pool I/O device operation confirmation module 140. Additionally, the pool I/O device operation confirmation module 140 can connect to an external device such as a disk medium 171 or an external storage device 172, and an external network 173.

In the computer system 100 having such a configuration, the pool I/O device operation confirmation section 140 periodically confirms whether or not the operation of the pool I/O device 120b is normal even if the current I/O device 120a is operating.

FIG. 1 shows a configuration in which the computer system 100 includes the pool I/O device operation confirmation module 140 and the storage device 150 containing various kinds of information (151 to 155) as mentioned above. However, the present invention is not limited to this configuration, but the pool I/O device operation confirmation module 141 and/or the storage device 150 may be provided outside of the computer system 100 depending on the application. For example, a plurality of computer systems 100 (such as a blade server) are disposed, and the pool I/O device operation confirmation sections, each of which executes an operation confirmation on a pool I/O device introduced into one of the computer systems 100 thereof, may be provided independent of the plurality of pairs of computer systems as described above. This configuration enables the pool I/O device management to be performed centrally.

<Brief Description of the Operation of the Computer System 100>

Now, the operation of the computer system 100 will be described briefly. The detailed description thereof will be given later with reference to flowcharts.

As shown in FIG. 1, the pool I/O device operation confirmation module 140 stores in memory 112b the pool I/O device operation confirmation section 141 which is a program for operation confirmation of the pool I/O device as described above, instructs the processor 111b to perform an operation confirmation on the connected pool I/O device 120b, and refer to and update various kinds of information stored in the storage device 150.

The aforementioned process is actually performed by the processor 111b which deals with a plurality of processes other than this process. To identify individual process, hereinafter the pool I/O device operation confirmation section 141 which is a program will be described as the one which performs the process. This applies to the description of a plurality of programs contained in the pool I/O device operation confirmation section 141. This also applies to the following flowcharts.

The pool I/O device operation confirmation module 140 uses the pool I/O device operation confirmation section 141 (program) by loading all or part thereof from the storage device 150 or an external device such as a disk medium 171, an external storage device 172, and an external network 173. In other words, for example, when the computer system 100 is activated, all or part of the program is read from the storage device 150 or an external device and stored in the memory 112b.

Figure 16:
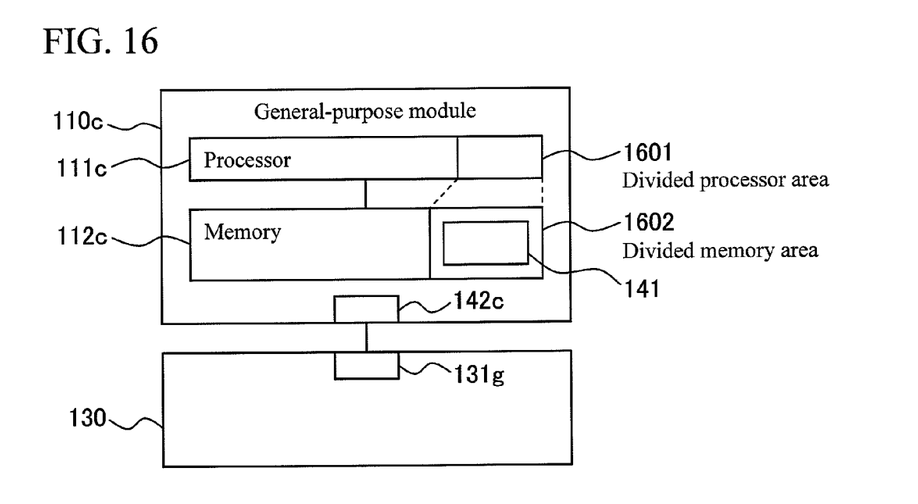
FIG. 16 shows an example in which a processor and a memory are virtualized.

When a server virtualization technology is applied, as shown in FIG. 16, it is possible to divide one processor into a plurality of divided processor areas, to divide one memory 112c into a plurality of divided memory areas 1602, and enable a program disposed in the divided memory area to be processed in a divided processor area 1601. In this case, the pool I/O device operation confirmation section 141 can be executed by disposing it in one of the divided memory areas 1602, and executing it in one of the divided processor areas 1601.

Figure 2:
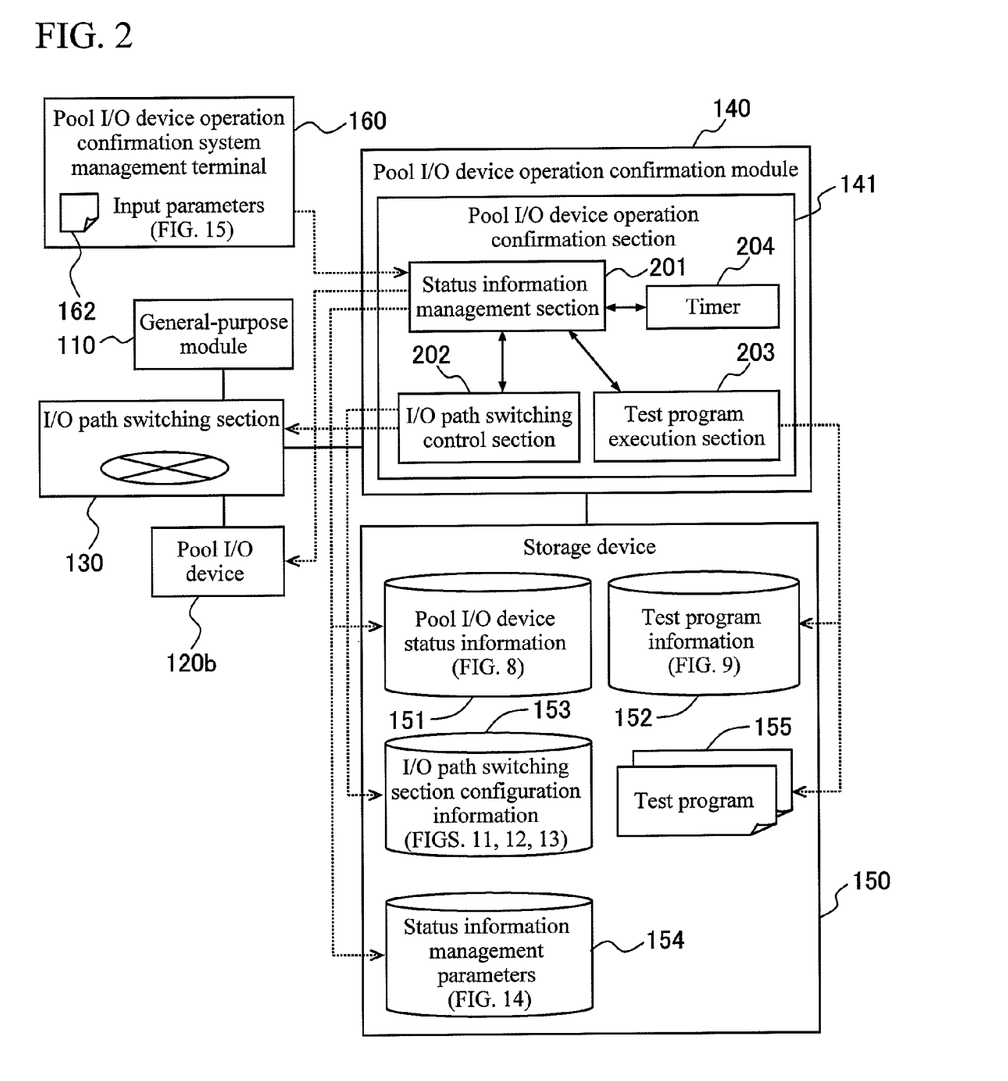
FIG. 2 shows a functional configuration of a pool I/O device operation confirmation section.

Next, the detailed configuration of the pool I/O device operation confirmation section 141 shown in FIG. 1 will be described with reference to FIG. 2. FIG. 2 shows the relationship between components of the pool I/O device operation confirmation section 141.

The pool I/O device operation confirmation section 141 is provided with one or more status information management sections 201, one or more I/O path switching control sections 202, one or more test program execution sections 203, and a timer 204.

At the time of pool I/O device operation confirmation, the status information management section 201 refers to the pool I/O device status information 151 managing a pool I/O device 120b to be subject to operation confirmation, and updates the information after the operation confirmation.

The I/O path switching control section 202 sends an I/O path switching control signal to the I/O path switching section 130 via an I/O path in response to an instruction signal from the information management section 201 and controls the I/O path switching section 130 to establish or release the connection between any one of the I/O devices 120a and 120b and the general-purpose module 110 or the pool I/O device operation confirmation module 140. Each time an operation confirmation is performed, an instruction is sent from the status information management section 201 to the I/O path switching control section 202, the connection corresponding to the pool I/O device to be subject to operation confirmation is established, the operation confirmation is performed (based on the corresponding test program) and later, the established connection is released.

The test program execution section 203 picks up a test program 155 corresponding to a pool I/O device 120*b* to be connected to the pool I/O device operation confirmation module 140, loads the program into memory, executes the program and obtains the operation confirmation results.

The timer 204 is used to obtain a time such as a status information update time. A timer specific to a processor may be used.

Subsequently, an example of the operation of the pool I/O device operation confirmation section 141 will be briefly described with reference to FIG. 2.

The pool I/O device operation confirmation section 141 executes the status information management section 201. When the computer system 100 is activated, the status information management section 201 performs a pool I/O device status information initialization process, and stores information about all connected pool I/O devices in the pool I/O device status information 151. When initialization is completed, the statuses of all pool I/O devices are "unconfirmed".

Next, the status information management section 201 performs a pool I/O device status information update process to periodically update each pool I/O device information stored in the pool I/O device status information 151. After update, the status is changed from "unconfirmed" to "normal" or "abnormal".

It should be noted that the status information management parameters 154 may be set to predetermined values as a default. Alternatively, the status information management section 201 may receive input parameters 162 entered by the manager 161 from the pool I/O device operation confirmation system management terminal 160 and may store the parameters in the status information management parameters 154.

During these processes, the status information management section 201 sends the following process requests particularly to the test program execution section 203 and the timer 204. More specifically, the status information management section 201 establishes and releases the connection between any one of the I/O devices 120*b* and the pool I/O device operation confirmation module 140 by sending a connection request and a connection release request to the I/O path switching control section 202.

In addition, the status information management section 201 sends a test program execution request for operation confirmation of the connected pool I/O device 120*b* to the test program execution section 203. The test program execution section 203 returns the operation confirmation result of the pool I/O device to the status information management section 201.

Further, the status information management section 201 sends a time information request to the timer 204, and the timer 204 returns the current time to the status information management section 201.

<Operation of the Status Information Management Section 201>

Figure 3:
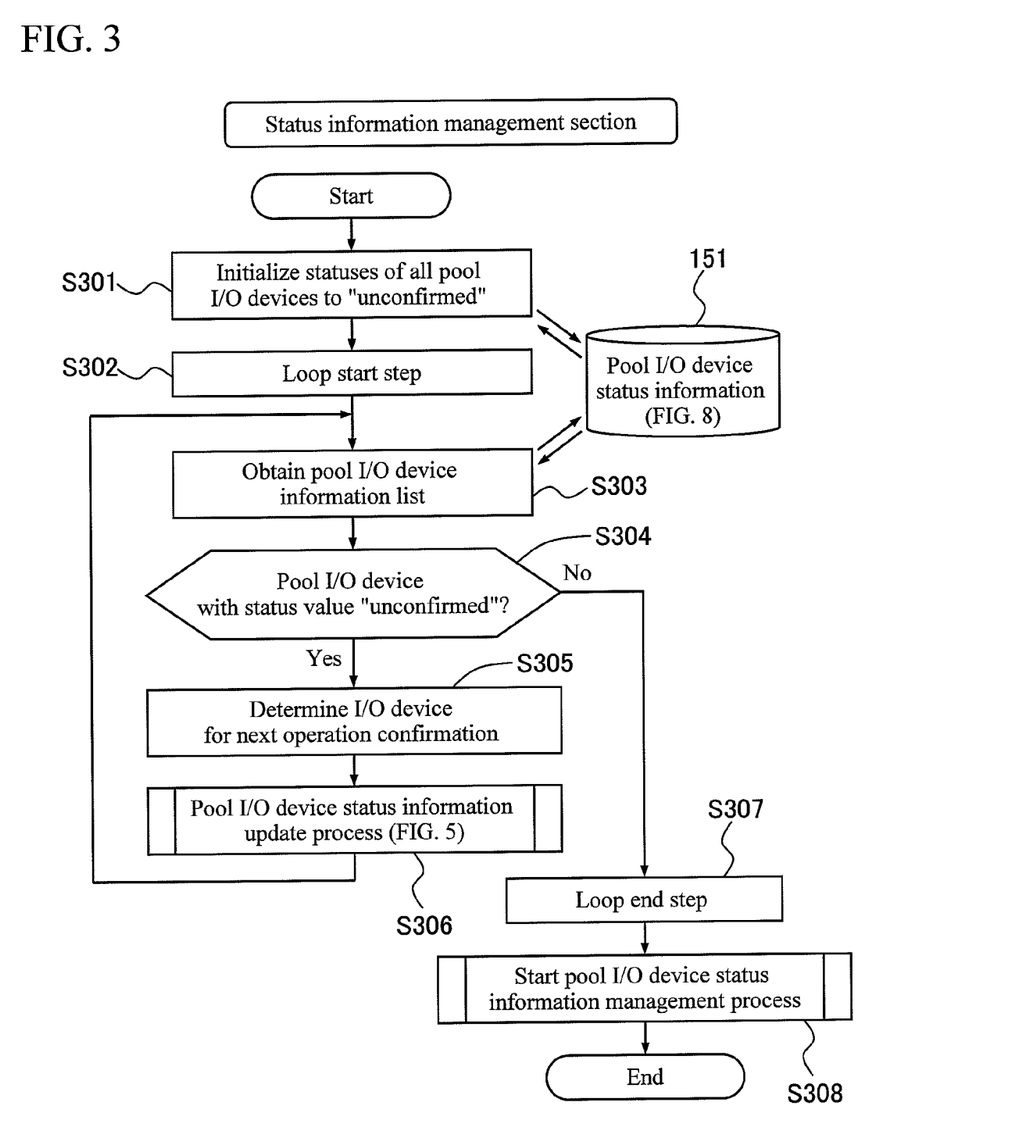
FIG. 3 is a flowchart explaining a pool I/O device status information initialization process by a status information management section.
Figure 4:
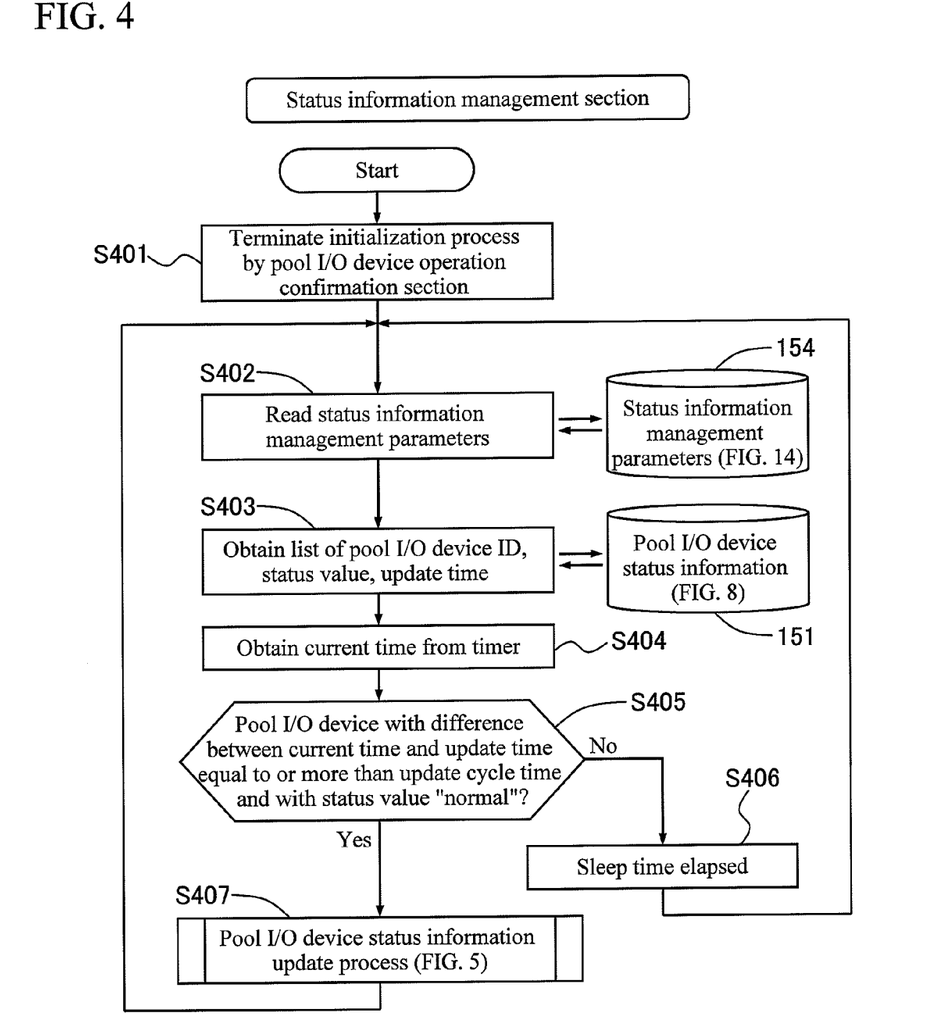
FIG. 4 is a flowchart explaining a pool I/O device status information management process by the status information management section.

With reference to FIGS. 3 and 4, the operation of the status information management section 201 will be described. First, an example of the procedure for pool I/O device status information initialization by the status information management section 201 will be described with reference to FIG. 3.

In response to a pool I/O device status information initialization process request, the status information management section 201 accesses the pool I/O device status information 151 and changes the status values of all pool I/O devices to "unconfirmed" (step S301). The status information management section 201 starts a loop (step S302). The status information management section 201 accesses the pool I/O device status information 151 to obtain a list of pool I/O device information (step S303). Further, a check is made to see whether or not there is a pool I/O device with the status value "unconfirmed" (step S304). If there is a pool I/O device with the status value "unconfirmed", one of the pool I/O devices 120*b* with the status value "unconfirmed" is selected for operation confirmation (step S305). Then, a status information update process is performed on this pool I/O device 120*b* (step S306) and control is returned to the step S303. If there is no pool I/O device with the status value "unconfirmed", the status information management section 201 terminates the initialization process (step S307) and starts the pool I/O device status information management process (step S308). This initialization process activates all components of the pool I/O device operation confirmation section 141 and the status values of all pool I/O devices can be stored in the pool I/O device status information 151. Afterward, an operation confirmation is periodically performed on each pool I/O device.

Next, with reference to FIG. 4, an example of the pool I/O device status information management process by the status information management section 201 will be described. When the aforementioned initialization process is terminated, the status information management section 201 starts the pool I/O device status information management process (step S401). First, the status information management section 201 reads the status information management parameters 154 into the memory 112*b* (step S402). Next, the status information management section 201 obtains a list of a pool I/O device ID, a pool I/O device type, and an update time from the pool I/O device status information 151 (step S403). Next, the status information management section 201 obtains the current time from the timer and compares the current time and the update time (step S404). Then, a check is made to see whether there is a pool I/O device where an update cycle time has been passed since the previous update time and which has a status value "normal" (step S405). If there is a pool I/O device with the status value "normal", the status information update process is performed on the pool I/O device (step S407), and control is returned to the step S402. If there is no pool I/O device with the status value "normal" (no operation confirmation is needed for a pool I/O device that has been judged as abnormal), waits until a sleep time has elapsed (step S406), and then control is returned to the step S402.

<Status Information Update Process>

The status information update process (steps S306 and S407) by the status information management section 201 shown in FIGS. 3 and 4 will be described in detail with reference to FIG. 5.

Figure 5:
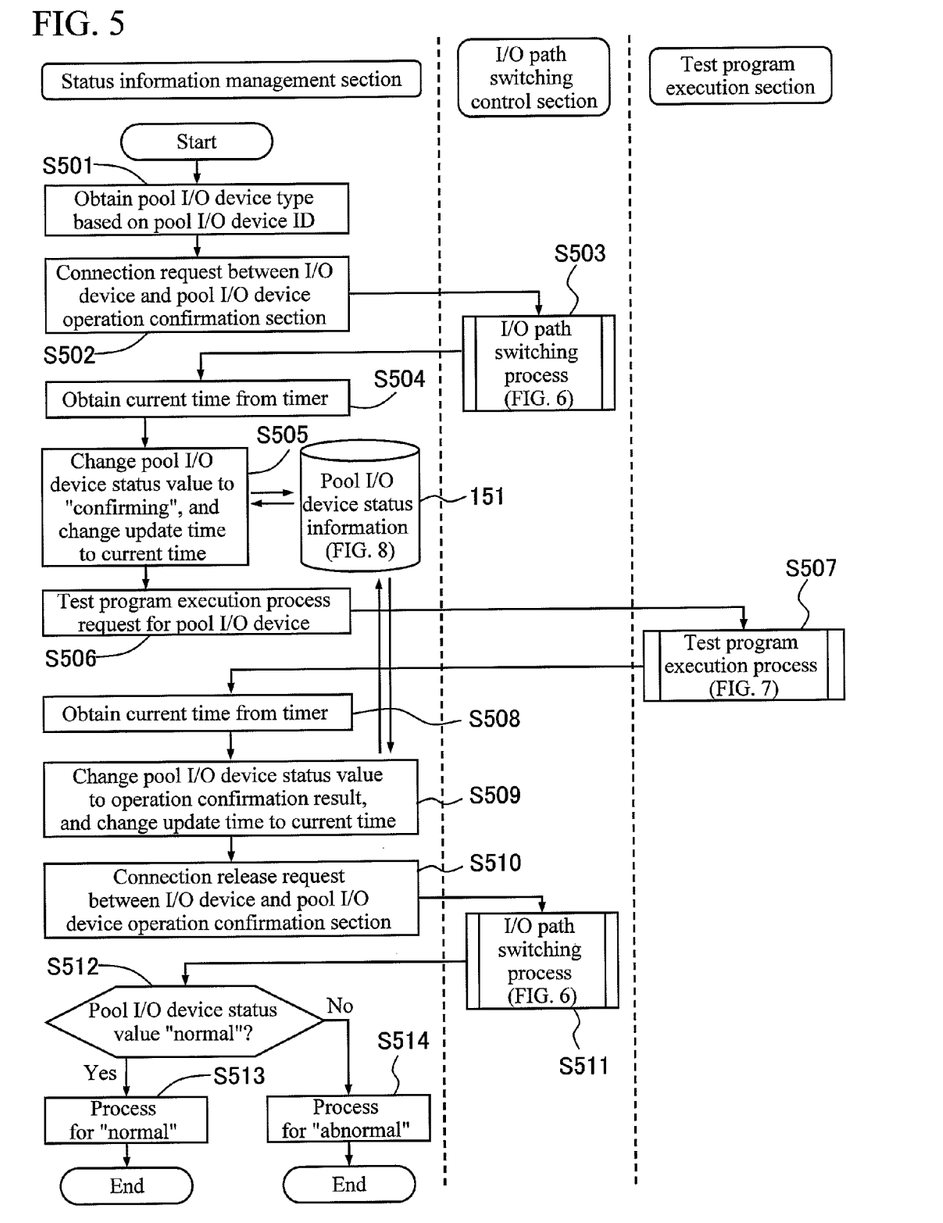
FIG. 5 is a flowchart explaining a pool I/O device status information update process by the status information management section.

FIG. 5 is a flowchart explaining an example of the status information update process by the status information management section 201. As shown in FIGS. 3 and 4, when the status information management section 201 starts the status information update process (steps S306 and S407), the status information management section 201 receives a pool I/O device ID as an input. The status information management section 201 obtains a pool I/O device type corresponding to the pool I/O device ID from the pool I/O device status information 151 (step S501). According to FIG. 5, the pool I/O device type is determined based on the pool I/O device ID, but a pair of the pool I/O device type and the pool I/O device ID may be received as an input.

When the status information update process is started, the status information management section 201 sends a connection request between a pool I/O device and the pool I/O device operation confirmation section 141 to the I/O path switching control section 202 (step S502). The I/O path switching control section 202 instructs the I/O path switching section 130 to execute a connection switching process of connecting the pool I/O device operation confirmation module 140 and the pool I/O device 120b (step S503). Then, the status information management section 201 obtains the current time from the timer 204 (step S504). Then, the status information management section 201 accesses the pool I/O device status information 151 to change the pool I/O device status value to "confirming", and change the update time to the current time (step S505).

Subsequently, the status information management section 201 sends a pool I/O device operation confirmation request to the test program execution section 203 (step S506). In response to the request, the test program execution section 203 executes a test program and returns the operation confirmation result to the status information management section 201 (step S507). The status information management section 201 obtains the current time from the timer 204 (step S508), accesses the pool I/O device status information 151 to change the pool I/O device status value to a status value corresponding to the operation confirmation result, and to change the update time to the current time (step S509). Here, the process may be configured such that during the time period of waiting for the test program execution section 203 to terminate the operation confirmation process, when a specific timeout period has elapsed since the time before the operation confirmation process started, the pool I/O device is determined as abnormal without waiting for the operation confirmation result to be returned, and the status value in the pool I/O device status information 151 is changed to "abnormal", and the process proceeds to the step S509.

Next, the status information management section 201 sends a connection release request to the I/O path switching control section 202 so as to release the connection between the pool I/O device where the operation confirmation has been completed and the pool I/O device operation confirmation section 141 (step S510). After the I/O path (connection) switching process was completed (step S511), a check is made to see whether the status value of the pool I/O device is "normal" or "abnormal" (step S512). If the status value is "normal", a process for "normal" specified by a manager is executed, and the update process is terminated (step S513). If the status value is "abnormal", a process for "abnormal" specified by a manager is executed, and the update process is terminated (step S514). For example, when the status value is "normal", the pool I/O device ID and a message indicating that the pool I/O device is normal are sent to the manager 161 via the pool I/O device operation confirmation system management terminal 160. When the status value is "abnormal", not only a message indicating that the pool I/O device is abnormal is sent, but also a process is executed to prohibit the connection to the pool I/O device which is determined as "abnormal".

<I/O Path Switching Process>

Figure 6:
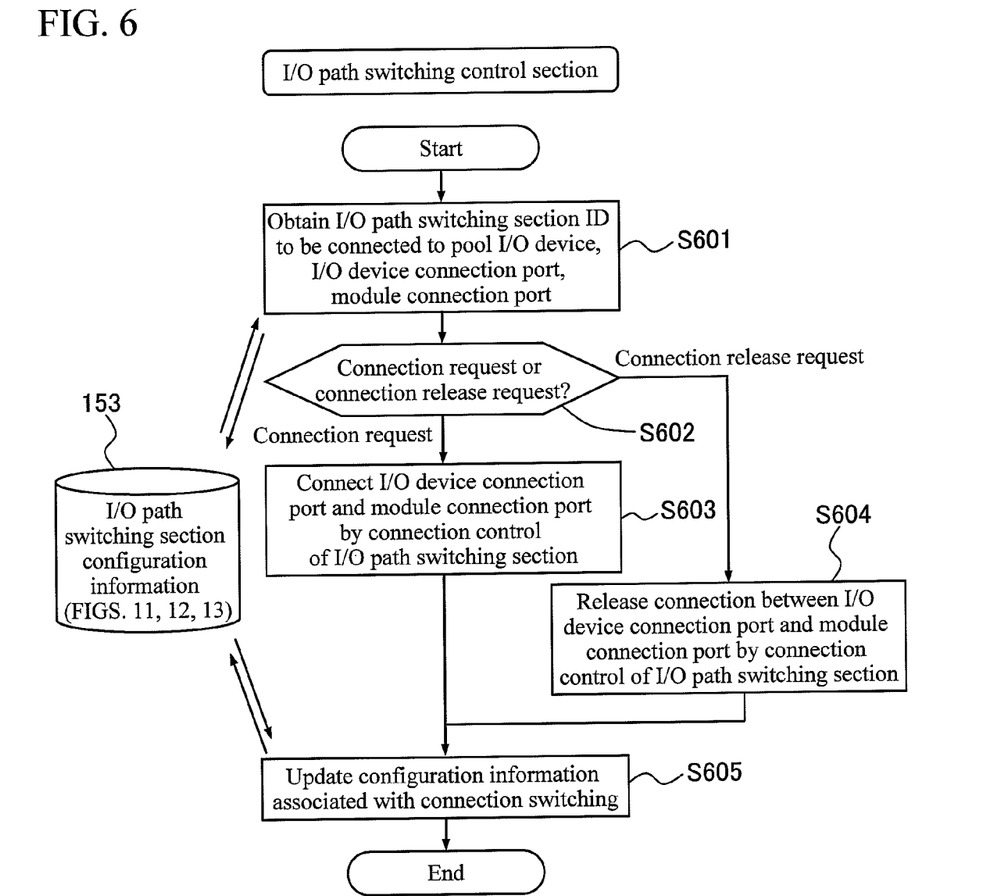
FIG. 6 is a flowchart explaining a connection switching process by an I/O path switching control section.

An example of the I/O path switching process (steps S503 and S511) by the I/O path switching control section 202 shown in FIG. 5 will be described with reference to FIG. 6.

The I/O path switching control section 202 obtains a pool I/O device ID as an input. In addition, the I/O path switching control section 202 obtains an I/O path switching section ID to be connected to the pool I/O device, the pool I/O device connection port, and the pool I/O device operation confirmation module connection port (step S601). Then, the I/O path switching control section 202 checks whether the requested process is a connection or a connection release (step S602). It should be noted that this check may be made by checking the information contained in a table of the I/O path switching control section 202 to see whether the information indicates a connection process or a connection release process.

If the requested process is a connection, the I/O path switching control section 202 controls the I/O path switching section 130 so as to connect the I/O device connection port and the pool I/O device operation confirmation module connection port (step S603). If the requested process is a connection release, the I/O path switching control section 202 controls the I/O path switching section 130 so as to release the connection between the I/O device connection port and the pool I/O device operation confirmation module connection port (step S604). Afterward, the I/O path switching control section 202 updates the I/O path switching section configuration information to meet the changed connection switching state (step S605).

<Test Program Execution Process>

Figure 7:
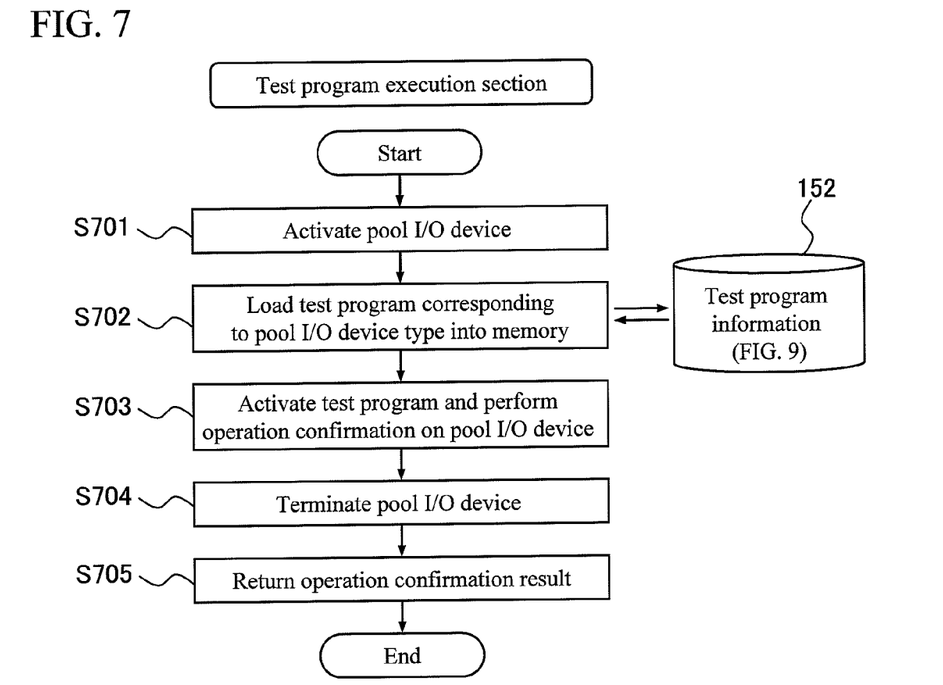
FIG. 7 is a flowchart explaining an operation confirmation process by a test program execution section.

FIG. 7 is a flowchart explaining an example of the test program execution process (step S507) shown in FIG. 5 by a test program execution section 203. First, a pool I/O device to be subject to operation confirmation is activated by a hot plug function (step S701). Next, the test program execution section 203 obtains a pool I/O device type as an input from the status information management section 201. The test program execution section 203 refers to test program information (see FIG. 9) to obtain the test program ID corresponding to the pool I/O device type. Then, the test program execution section 203 obtains a test program corresponding to the pool I/O device ID stored in a storage device (step S702). The test program execution section 203 executes the test program on the pool I/O device 120b activated at the step S701 to perform an operation confirmation on the pool I/O device 120b (step S703). After the operation confirmation was completed, the test program execution section 203 terminates the pool I/O device (step S704), returns the operation confirmation result (step S705), and terminates the operation confirmation process.

If the OS operating the pool I/O device operation confirmation module 140 does not have a hot plug function, a step for recognizing the pool I/O device to be subject to operation confirmation can be executed by rebooting the OS.

<Examples of Pool I/O Device Status Information>

Figure 8:
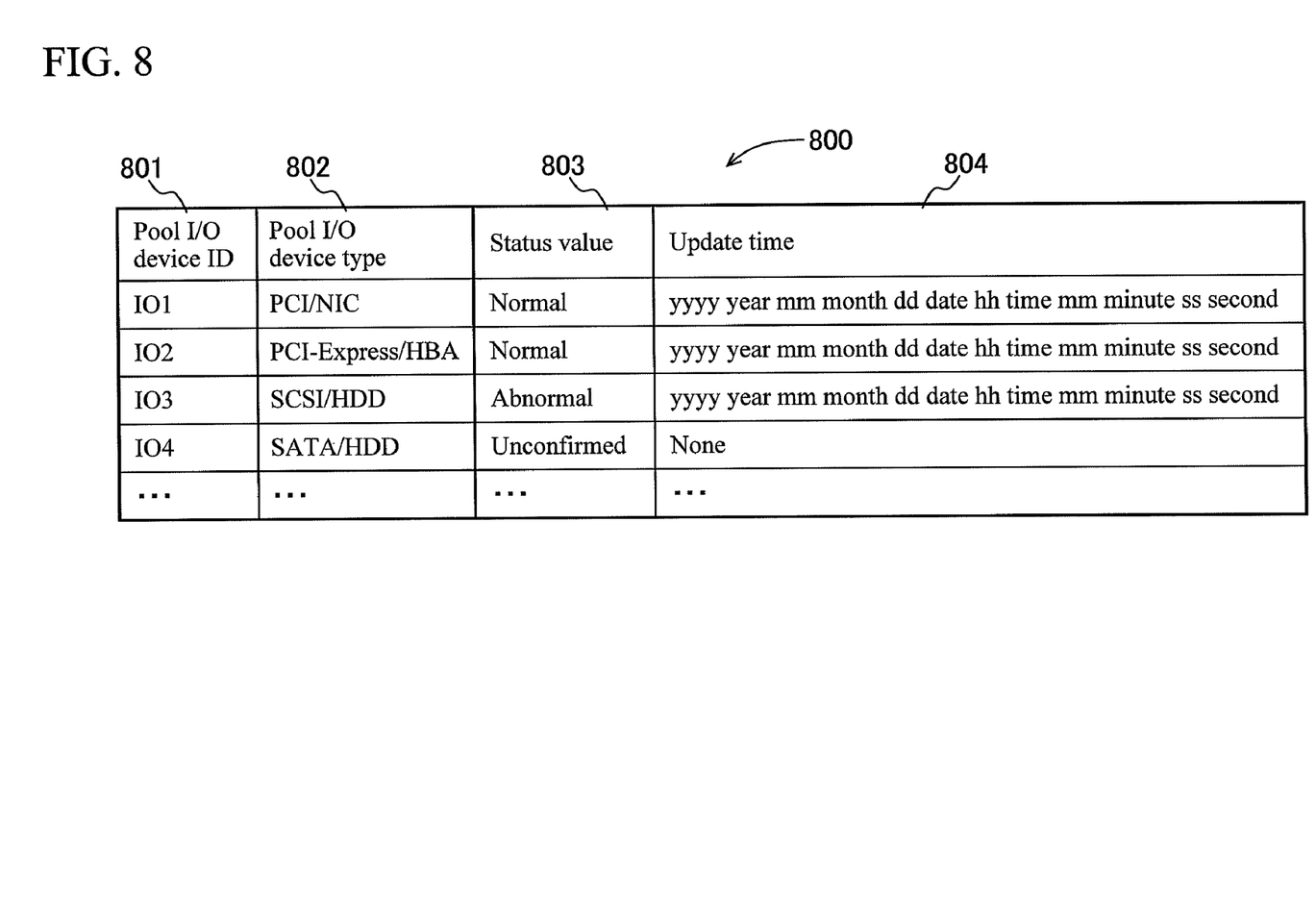
FIG. 8 shows an example of pool I/O device status information.

FIG. 8 shows an example of pool I/O device status information 151. In FIG. 8, for example, the pool I/O device status information 151 is composed of a pool I/O device ID, a pool I/O device status type, a pool I/O device status value, and a pool I/O device update time, each of which corresponds to each other. With reference to FIG. 8, a pool I/O device having "ID=1" corresponds to a pool I/O device type "PCI/NIC" which means the pool I/O device is a network information card (NIC) connected through a PCI bus, and its status value is "normal". In this way, the pool I/O device ID can be used to refer to the device type, the status value, and the update time of the pool I/O device.

<Examples of Test Program Information>

Figure 9:
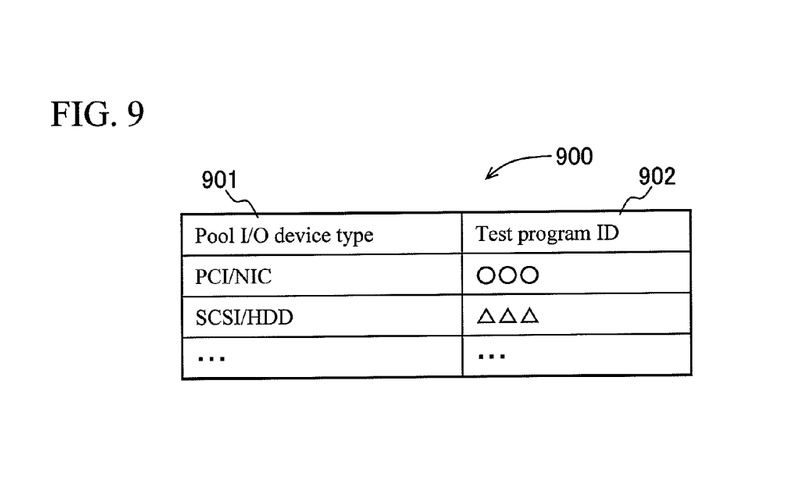
FIG. 9 shows an example of test program information.

FIG. 9 shows an example of test program information. The test program information has a test program ID corresponding to a pool I/O device type. Accordingly, when the pool I/O device type is identified, the corresponding test program ID can be obtained. Then, the test program 155 can be referred based on the obtained test program ID, and an optimum test program for operation confirmation of the pool I/O device can be obtained.

<Examples of I/O Path Switching Section Configuration Information>

FIGS. 10 to 13 are drawings for explaining examples of I/O path switching section configuration information required for connection switching control.

Figure 10:
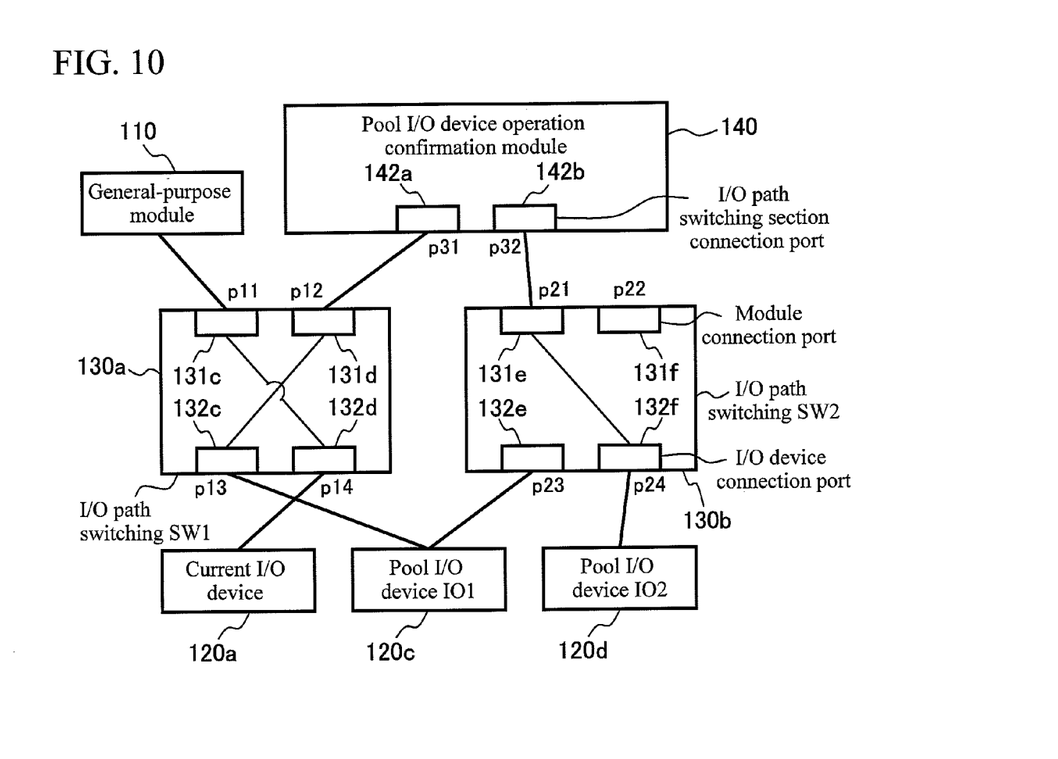
FIG. 10 shows an example of a connection configuration among an I/O path switching section, a pool I/O device operation confirmation module and I/O devices.

FIG. 10 shows an example of a connection configuration among the I/O path switching section 130, the pool I/O device operation confirmation module 140 and I/O devices 120. With reference to FIG. 10, the pool I/O device operation confirmation module 140 is connected to two I/O path switching sections 130a and 130b, each of which is arbitrarily connected to one of the two pool I/O devices 120c and 120d.

Figure 11:
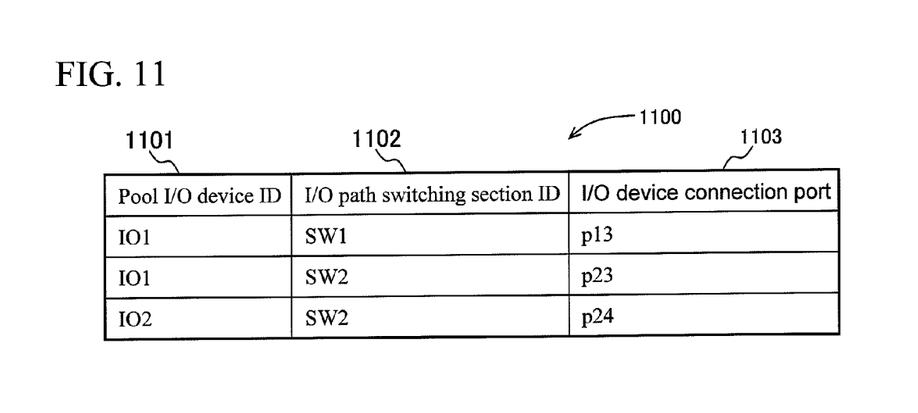
FIG. 11 shows an example of connection information between the I/O devices and the I/O path switching section.
Figure 12:
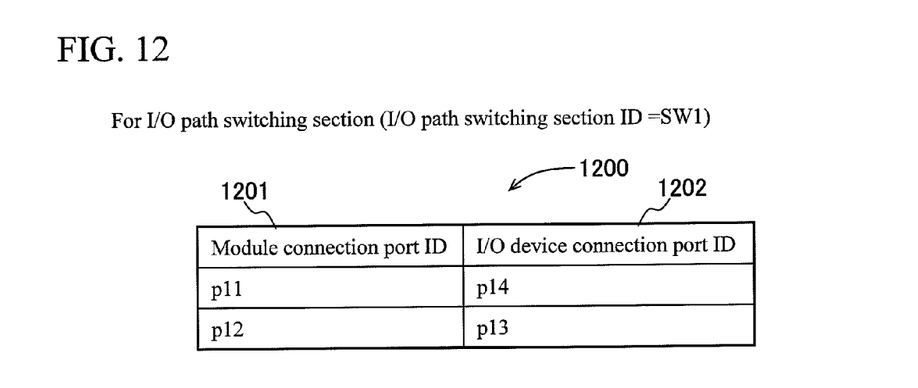
FIG. 12 shows an example of connection information inside the I/O path switching section.
Figure 13:
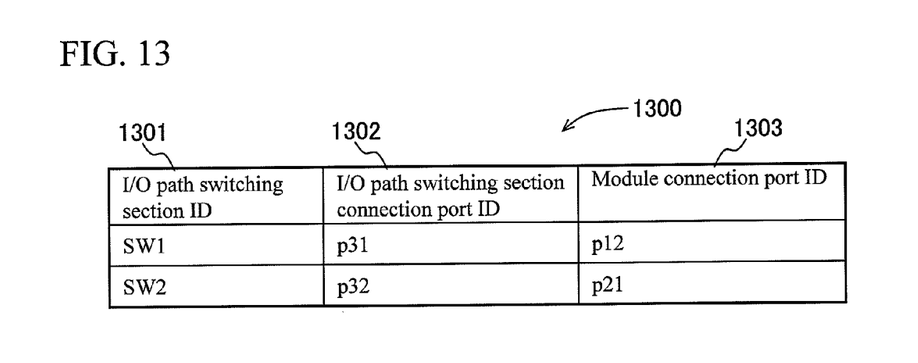
FIG. 13 shows an example of connection information between the I/O path switching section and the pool I/O device operation confirmation module.

FIGS. 11 to 13 show three pieces of information: connection configuration information between a pool I/O device and an I/O path switching section, connection configuration information inside the I/O path switching section, and connection configuration information between the pool I/O device operation confirmation module and the I/O path switching section as I/O path switching section configuration information in which a connection relation between the pool I/O device operation confirmation module 140 and pool I/O devices 120c and 120d is defined for each port.

With reference to FIG. 11, connection configuration information 1100 between a pool I/O device and an I/O path switching section has information about a pool I/O device ID 1101, an I/O path switching section ID 1102 connected to a pool I/O device corresponding to the pool I/O device ID 1101, and an I/O device connection port ID 1103 to which the pool I/O device is connected. As shown in FIG. 11, it is understood that the pool I/O device 120c (pool I/O device ID=IO1) is connected to the I/O device connection port 132c (I/O device connection port ID=p13) in the I/O path switching section 130a (I/O path switching section ID=SW1) and is also connected to the I/O device connection port 132e (I/O device connection port ID=p23) in the I/O path switching section 130b (I/O path switching section ID=SW2).

Next, with reference to FIG. 12, the connection configuration information inside the I/O path switching section 1200 has a list of connection pairs between the module connection ports 131c, 131d, 131e, and 131f and I/O device connection ports 132c, 132d, 132e, and 132f In FIG. 10, as shown in FIG. 12, the module connection port 131c (module connection port ID=p11) is connected to the I/O device connection port 132d (I/O device connection port ID=p14) and the module connection port 131d (module connection port ID=p12) is connected to the I/O device connection port 132c (I/O device connection port ID=p13) in the I/O path switching section 130a (I/O path switching section ID=SW1).

Further, in FIG. 13, connection configuration information 1300 between the I/O path switching section and the pool I/O device operation confirmation module has information about an I/O path switching section ID 1301, an I/O path switching section connection port ID 1302, and a module connection port ID 1303. The connection configuration information 1300 between the I/O path switching section and the pool I/O device operation confirmation module indicates that a path connecting the pool I/O device operation confirmation module 140 and the I/O path switching section 130 corresponding to the I/O path switching section ID 1301 connects the I/O path switching section connection port ID 1302 and the module connection port ID 1303. As shown in FIG. 13, it is understood that the pool I/O device operation confirmation module 140 is connected to the module connection port 131d (module connection port ID=p12) of the I/O path switching section (I/O path switching section ID=SW1) via the I/O path switching section connection port 142a (I/O path switching section connection port ID=p31), and an I/O path switching control signal may be sent to the I/O path switching section 130a (I/O path switching section ID=SW1) via the I/O path switching section connection port 142a (I/O path switching section connection port ID=p31).

<Examples of Status Information Management Parameters>

Figure 14:
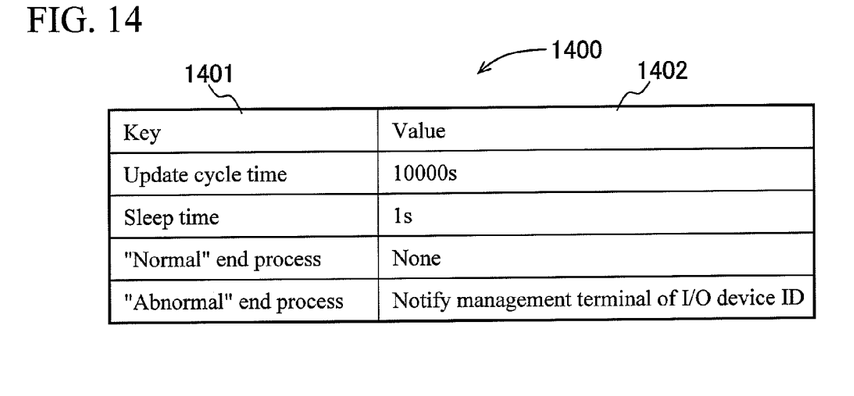
FIG. 14 shows an example of status information management parameters.

FIG. 14 shows an example of status information management parameters. The status information management parameters include an update cycle time, a sleep time, a "normal" end process, and an "abnormal" end process as key information, and have parameter values corresponding to the keys. For example, in FIG. 14, the "abnormal" end process indicates that the pool I/O device operation confirmation system management terminal is to be notified of the pool I/O device ID. This status information management parameter is read each time a loop is started in the status information management process shown in FIG. 4, and the content is applied to the status information management process.

<Parameter Input by Manager>

Figure 15:
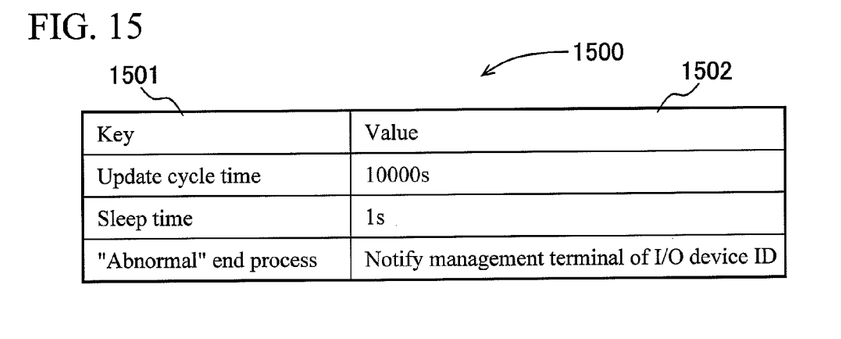
FIG. 15 shows an example of parameters inputted by a manager.

FIG. 15 shows an example of parameters 162 inputted by a manager. The manager input parameters 162 are composed of a plurality of pairs of parameters combining keys and values. FIG. 15 shows three pairs of parameters, and each key corresponds to a key of a status information management parameter. Additionally, the status information management section 201 inputs the value of the input parameter into the value of a status information management parameter corresponding to the key. For example, in step S402 of FIG. 4, when the pool I/O device operation confirmation system receives an input parameter shown in FIG. 15, and applies the input parameter to the status information management parameter shown in FIG. 14, the value is assigned to the parameter corresponding to the key.

<Summary of Embodiments>

The pool I/O device operation confirmation method in accordance with embodiments of the present invention can be applied to building a large scale computer system and to operating IT application services requiring high reliability thereon.

According to such present embodiments, the pool I/O device operation confirmation module can hold the operation confirmation results of each pool I/O device 120b as the status value 803 to periodically perform an operation confirmation on each pool I/O device. The status information update process of the status information management section 201 can update the pool I/O device status information 151 while the general-purpose module 110 is operating processes since the status information update process does not affect the current I/O device connected to the general-purpose module 110 and the connection path. In other words, an operation confirmation of a pool I/O device introduced in a computer system such as a blade server can be periodically performed without affecting the operating general-purpose module and the current I/O device, thereby reducing the fault recovery time without leaving the faulty pool I/O device as is.

More specifically, the pool I/O device operation confirmation section obtains pool I/O device status information from a pool I/O device status information storage section (provided inside or outside the computer system), the status information including a pool I/O device ID for identifying the pool I/O device, a pool I/O device type and a status value indicating the operation confirmation result, and an update time indicating the most recent operation confirmation time; activates a pool I/O device and performs an operation confirmation; terminates the operation of the pool I/O device after the operation confirmation; and updates the pool I/O device status information using the operation confirmation results obtained by the operation confirmation. In this way, an operation confirmation is performed for each pool I/O device based on the status information. Accordingly, an operation confirmation can be performed securely and individually (in a cycle different for each pool I/O device) without affecting the currently operating I/O device as described above.

In addition, in operation confirmation, the pool I/O device operation confirmation section obtains I/O path switching section configuration information, which specifies a path for connecting to the pool I/O device and which includes an internal connection relation of the I/O path switching section, from the I/O path switching section configuration information storage section; controls the I/O path switching section based on the I/O path switching section configuration information; executes connection to the pool I/O device to be subject to operation confirmation; and releases the connection state after the operation confirmation. Accordingly, the I/O path to be used for operation confirmation can be effectively allocated to each pool I/O device and the operation confirmation process can also be performed in high speeds. For example, if the number of pool I/O devices is small, the I/O path switching section configuration information does not need to be obtained for each operation confirmation. In such a case, the pool I/O device operation confirmation section may execute connection to a pool I/O device by detecting an unused path of the I/O path switching section and release the connection state after the operation confirmation.

In addition, in operation confirmation, the pool I/O device operation confirmation section obtains test program information, which is included in pool I/O device status information and which determines the operation confirmation information to be used according to the type of the pool I/O device, from a test program information storage section; executes a test program corresponding to the obtained test program information; and executes an operation confirmation on the pool I/O device. Hereby, optimum operation confirmation can be performed according to the pool I/O device type.

Further more specifically, the pool I/O device operation confirmation section may obtain a status information management parameter, which is to be used for management process of pool I/O device status information and which includes an update cycle time, from a status information management parameter section and execute an operation confirmation on a pool I/O device in which the update cycle time has elapsed on the basis of the obtained status information management parameter. Hereby, a different parameter can be assigned to each pool I/O device. In particular, a different operation confirmation cycle can be specified for each pool I/O device. Accordingly, an optimum operation confirmation process can be executed for each pool I/O device. It should be noted that the status information management parameter may further include a sleep time as a parameter and if there is no pool I/O device in which the update cycle time has elapsed, the pool I/O device operation confirmation section may restart the pool I/O device operation confirmation after the sleep time has elapsed. Alternatively, the pool I/O device operation confirmation section may change the status information management parameter in response to an input instruction from an external terminal connected to the computer system. Hereby, the manager can change the parameter accordingly using the external terminal and thus can provide a desired operation confirmation process.

It should be noted that the present invention may be implemented by a software program code providing the function of the present embodiments. In this case, a storage medium in which the program code is stored is provided in a system or a device, a computer (a CPU or an MPU) of the system or the device reads the program code from the storage medium. In this case, the program code itself serves to implement the function of the present embodiments described above, and the program code itself and the storage medium containing thereof serve to constitute the present invention. Examples of the storage medium for supplying such a program code include a floppy® disk, a CD-ROM, a DVD-ROM, a hard disk, an optical disk, a magnet-optical disk, a CD-R, a magnetic tape, a nonvolatile memory card, a ROM, and the like.

Alternatively, the function of the aforementioned present embodiments may be implemented by allowing the operating system (OS) running on a computer to perform all or part of the actual processes in response to an instruction of the program code. Further, the function of the aforementioned present embodiments may be implemented by reading the program code from the storage medium, writing the read program code into a memory of the computer, and then allowing the CPU of the computer to perform all or part of the actual processes in response to an instruction of the program code.

Alternatively, the function of the aforementioned present embodiments may be implemented by delivering the software program code providing the function of the present embodiments via a network, storing the program code in a storage means such as a hard disk or a memory of the system or the device or a storage medium such as a CD-RW and CD-R, and then allowing the computer (or a CPU or an MPU) of the system or the device to read the program code from the storage means or the storage medium and execute the program code.

What is claimed is:

1. A pool I/O device operation confirmation method of confirming the operation of a pool I/O device in a computer system, the computer system comprising: a general-purpose module having at least one processor; at least one current I/O device which is actually operating to transfer an input/output of said general-purpose module to and from an external device; at least one pool I/O device which is provided as a backup of the current I/O device and is waiting; and at least one I/O path switching section for switching the I/O paths connecting said general-purpose module, said current I/O device and said pool I/O device, wherein the computer system further comprises a pool I/O device operation confirmation module which is connected with the I/O path switching section and includes a pool I/O device operation confirmation section, the method comprising the step of said pool I/O device operation confirmation section periodically confirming the operation of said pool I/O device, wherein said pool I/O device operation confirmation section is located upstream from said I/O path switching section with a control signal being send downstream from said pool I/O device operation confirmation section to said I/O path switching section;

wherein said pool I/O device operation confirmation section obtains pool I/O device status information from a pool I/O device status information storage section, the status information including a pool I/O device ID for identifying said pool I/O device, a type of said pool I/O device, a status value indicating an operation confirmation result, and an update time indicating the most recent operation confirmation time;

activates said pool I/O device and performs an operation confirmation thereon;

terminates the operation of said pool I/O device after the operation confirmation; and updates said pool I/O device status information using the operation confirmation result obtained by the operation confirmation;

wherein said pool I/O device operation confirmation section obtains I/O path switching section configuration information, which specifies a path for connecting to said pool I/O device and which includes an internal connection relation of said I/O path switching section obtained from an I/O path switching section configuration information storage section;

controls said I/O path switching section based on said I/O path switching section configuration information;

executes a connection state to the pool I/O device to be subjected to operation confirmation; and releases the connection state after the operation of said pools I/O device is confirmed;

wherein said pool I/O device operation confirmation section obtains test program information, which is included in said pool I/O device status information and which determines an operation confirmation program among a plurality of operation confirmation programs to be used according to the type of said pool I/O device, from a test program information storage section;

executes a test program corresponding to said obtained test program information; and executes an operation confirmation on said pool I/O device.

2. The pool I/O device operation confirmation method according to claim 1, wherein said pool I/O device operation confirmation section obtains a status information management parameter, which is to be used for a management process of said pool I/O device status information and which includes an update cycle time, from a status information management parameter storage section and executes the operation confirmation on a pool I/O device in which said update cycle time has elapsed on the basis of said obtained status information management parameter.

3. The pool I/O device operation confirmation method according to claim 2, wherein said status information management parameter further includes a sleep time as a parameter, and if there is no pool I/O device in which said update cycle time has elapsed, said pool I/O device operation confirmation section restarts the pool I/O device operation confirmation after said sleep time has elapsed.

4. The pool I/O device operation confirmation method according to claim 2, wherein said pool I/O device operation confirmation section changes said status information management parameter in response to an input instruction from an external terminal connected to said computer system.

5. A computer system comprising:

a general-purpose module having at least one processor;

at least one current I/O device which is actually operating to transfer an input/output of said general-purpose module to and from an external device;

at least one pool I/O device which is provided as a backup of the current I/O device and is waiting;

at least one I/O path switching section for switching the I/O paths connecting said general-purpose module, said current I/O device and said pool I/O device; and a pool I/O device operation confirmation section which periodically confirms the operation of said pool I/O device, a pool I/O device operation confirmation module with is connected with the I/O path switching section and includes a pool I/O device operation confirmation section;

wherein said pool I/O device operation confirmation section is located upstream from said I/O path switching section with a control signal being sent downstream from said pool I/O device operation confirmation section to said I/O path switching section;

wherein said pool I/O device operation confirmation section obtains pool I/O device status information from a pool I/O device status information storage section, the status information including a pool I/O device ID for identifying said pool I/O device, a type of said pool I/O device, a status value indicating an operation confirmation result, and an update time indicating the most recent operation confirmation time;

activates said pool I/O device and performs an operation confirmation thereon;

terminates the operation of said pool I/O device after the operation confirmation; and updates said pool I/O device status information using the operation confirmation result obtained by the operation confirmation;

wherein said pool I/O device operation confirmation section obtains I/O path switching section configuration information, which specifies a path for connecting to said pool I/O device and which includes an internal connection relation of said I/O path switching section obtained from an I/O path switching section configuration information storage section;

controls said I/O path switching section based on said I/O path switching section configuration information;

executes a connection state to the pool I/O device to be subjected to operation confirmation; and releases the connection state after the operation of said pools I/O device is confirmed;

wherein said pool I/O device operation confirmation section obtains test program information, which is included in said pool I/O device status information and which determines an operation confirmation program among a plurality of operation confirmation program to be used according to the type of said pool I/O device, from a test program information storage section;

executes a test program corresponding to said obtained test program information; and executes an operation confirmation on said pool I/O device.

6. The computer system according to claim 5, wherein said pool I/O device operation confirmation section obtains a status information management parameter, which is to be used for a management process of said pool I/O device status information and which includes an update cycle time, from a status information management parameter storage section and executes an operation confirmation on a pool I/O device in which said update cycle time has elapsed on the basis of said obtained status information management parameter.

7. The computer system according to claim 6, wherein said status information management parameter further includes a sleep time as a parameter and if there is no pool I/O device in which said update cycle time has elapsed, said pool I/O device operation confirmation section restarts the pool I/O device operation confirmation after said sleep time has elapsed.

8. The computer system according to claim 6, wherein said pool I/O device operation confirmation section changes said status information management parameter in response to an input instruction from an external terminal.

* * * * *